United States Patent [19]

Sekine et al.

[11] Patent Number: 4,600,869
[45] Date of Patent: Jul. 15, 1986

[54] METHOD AND DEVICE FOR INPUTTING CO-ORDINATES FOR ROBOT

[75] Inventors: Yoshitada Sekine, Hoya; Fumiki Yokota, Yamato, both of Japan

[73] Assignee: Nissan Motor Company, Limited, Yokohama, Japan

[21] Appl. No.: 584,940

[22] PCT Filed: May 27, 1983

[86] PCT No.: PCT/JP83/00166
§ 371 Date: Jan. 25, 1984
§ 102(e) Date: Jan. 25, 1984

[87] PCT Pub. No.: WO83/04324
PCT Pub. Date: Dec. 8, 1983

[30] Foreign Application Priority Data

May 31, 1982 [JP] Japan .................. 57-091462

[51] Int. Cl.⁴ .............................. G05B 19/18
[52] U.S. Cl. .................. 318/568; 318/640; 318/569; 364/193; 364/474
[58] Field of Search ........... 318/640, 594, 568, 567, 318/632, 577, 571; 364/191, 192, 193, 170, 513, 474, 475, 571, 550, 551; 250/204, 201, 202

[56] References Cited

U.S. PATENT DOCUMENTS

| | | | |
|---|---|---|---|
| 3,888,362 | 6/1975 | Fletcher | 318/640 |
| 4,105,937 | 8/1978 | Tuda | 318/568 |
| 4,190,889 | 2/1980 | Etoh | 364/474 |
| 4,193,021 | 3/1980 | Gale | 318/568 |
| 4,260,187 | 4/1981 | Bejczy | 318/640 |
| 4,287,459 | 9/1981 | Dahlstrom | 318/568 |
| 4,355,362 | 10/1982 | Imazeki | 364/474 |
| 4,453,221 | 6/1984 | Davis | 364/191 X |
| 4,485,453 | 11/1984 | Taylor | 318/568 |

Primary Examiner—William M. Shoop, Jr.
Assistant Examiner—Patrick C. Keane
Attorney, Agent, or Firm—Schwartz, Jeffery, Schwaab, Mack, Blumenthal & Evans

[57] ABSTRACT

A method and a device for inputting the coordinates of a robot acts so that the coordinates are input accurately by scanning the working area of the robot and inputting, as coordinates of the working position, positional data when a sensor has detected the working position. A movement data calculator (138) receives target position data from a preteaching data area (146), operates a pulse register (130) and drive circuits (152), (154), (156), and makes the sensor positional data in a position register (130) coincide with the target positional data. It then receives positional vector data from a plane scanning data area (148) and a vertical scanning data area (150) and scans the sensor over the working area. When a detector (526) detects the fact that the sensor has reached the working position, a pulse distributor (11) stops the operation, and the sensor positional data stored in the register (130) is fed to a calculator writer (132) which calculates the positional coordinates of the robot, and writes them into a teaching data storage area (136) in a memory (134).

16 Claims, 14 Drawing Figures

METHOD AND DEVICE FOR INPUTTING CO-ORDINATES FOR ROBOT

FIELD OF THE INVENTION

The present invention relates generally to a method for inputting the co-ordinates of working positions as part of the programming operation for a robot which is applicable to automated manufacturing lines, such as in automotive vehicle manufacture, vehicle parts manufacture and so forth, and a device adapted for inputting the coordinates. More particularly, the invention relates to a method and a device for automatically inputting the coordinates of working positions by scanning working volumes by means of a sensor.

Recently, assembly robots have become available for practical use. In such assembly robots, it is considered very important to efficiently perform the required assembly operations, e.g., fastening, parts fitting, etc. and to reduce or eliminate mis-operation.

For example, in the case of fastening operations, an automatic screw-tightening tool with automatic screw supply is held by a mechanical hand directly or indirectly secured to one of a movable section of the robot. The robot is designed to accurately position the working end of the automatic screw-tightening tool above a hole formed in a workpiece, and then to move the automatic screw-tightening tool downwardly to perform the screw-tightening operation.

In order to perform the foregoing tightening operation efficiently, it is necessary to ensure not only accurate repeatability of the operation, but also accurate positioning of the workpiece in order to align the hole receiving the screw with the pre-programmed working position of the robot.

Therefore, in practice, the robot is programmed by means of a remote control teaching box, for example, which accurately positions the automatic screw-tighting tool over each hole in the workpiece in order to obtain position data for the robot.

However, it is very difficult to perform this programming with strict accuracy. Even if such strictly accurate programming is possible, it may take a long time and require very high programming skill.

The invention is intended, in consideration of the foregoing drawbacks, to provide a co-ordinate inputting device which can easily and accurately program robot operation.

SUMMARY OF THE INVENTION

According to the present invention, there is provided a method for automatically inputting the co-ordinates of a number of working positions by scanning the working volumes of the robot with a sensor, calculating the co-ordinates of each working position with respect to the robot co-ordinate axes whenever the sensor detects a working position, and sequentially storing the obtained co-ordinates in a memory.

In addition, a working position co-ordinates inputting device for robots comprises a detector means coupled to the working end of the robot for automatically scanning an area including the working position. The instantaneous position of the robot is memorized whenever the detecting means detects a working position.

It should be noted that, in this specification, the "working end" of the robot refers the end of the sensor in the case where the sensor is secured to a wrist section at the end of the movable section of the robot. "Working end" refers to the end of a mechanical hand when such is secured to the wrist section or the end of a tool, such as automatic screw tightening tool, in cases where the latter is held by the wrist section or mechanical hand.

DESCRIPTION OF THE PREFERRED EMBODIMENTS

Figure 1:
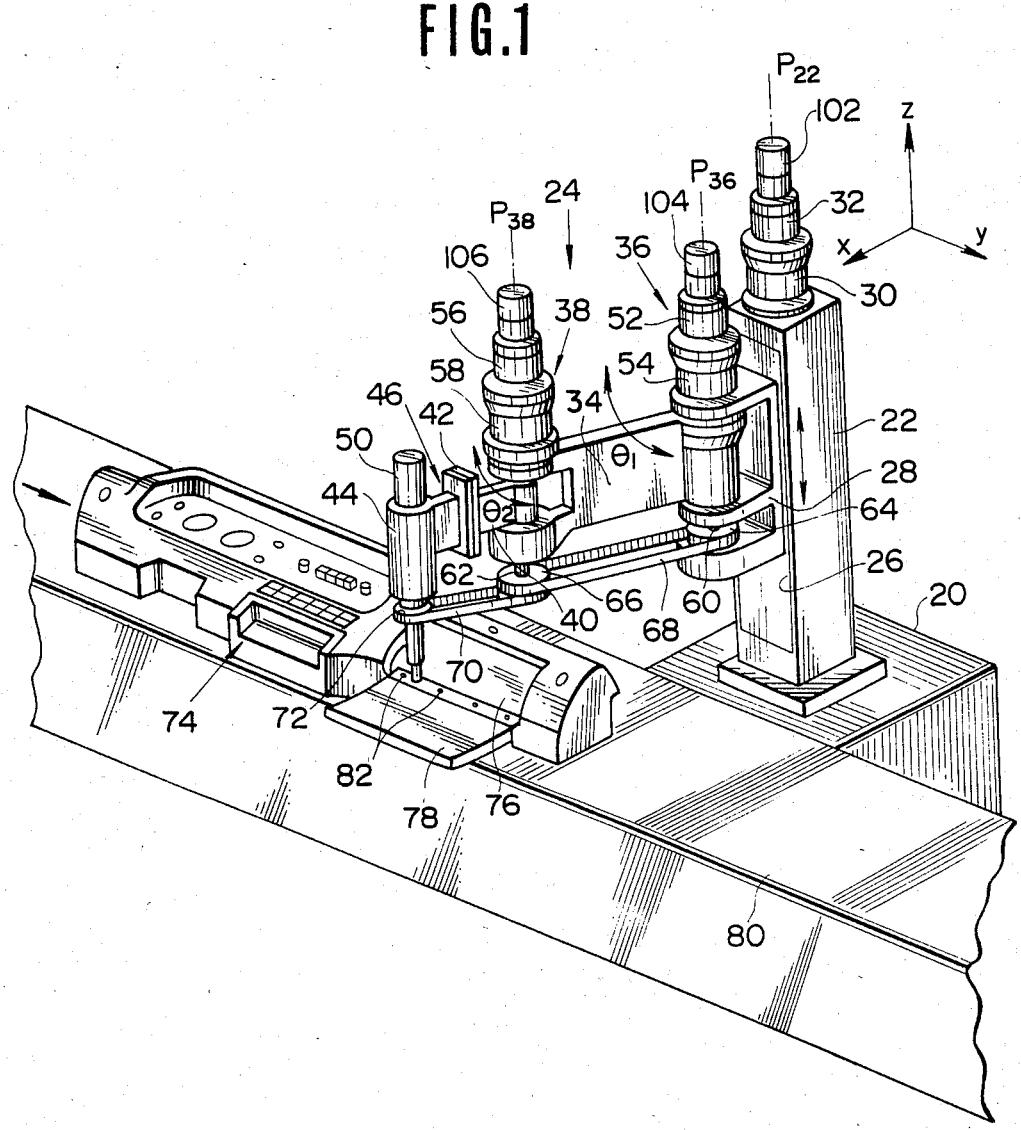
FIG. 1 is a perspective view of a horizontal multi-axis-type robot during teaching according to the present invention.

Referring now to the drawings, FIG. 1 shows an example of a horizontal multi-axis-type (SCARA-type) robot to which the preferred embodiment of a co-ordinates inputting device according to the present invention is applicable. The robot comprises a stationary support 22 extending vertically from a stationary base 20, and a movable arm 24 supported by the stationary support. The movable arm 24 includes a lifter 28 which can move vertically along a guide surface 26 of the stationary support which guide surface extends parallel to an axis $P_{22}$ of the stationary support 22. The lifter 28 is associated with a lifting mechanism (not shown) driven by an electric servo-motor 32 via a speed reducer 30.

The lifter 28 is connected to one end of a first arm 34 via a first joint 36. The first arm is horizontally pivotable about the vertical axis $P_{36}$ of the first joint (as shown by arrow $\theta_1$). The other end of the first arm 34 is connected to one end of a second arm 40 via a second joint 38. The second arm 40 is horizontally pivotable about a vertical axis $P_{38}$ of the second joint 38 (as shown by arrow $\theta_2$). The other end of the second arm 40 is associated with a wrist 46 with a tool holder 44 via an end piece 42. When working position co-ordinates are being inputted, as is the case in FIG. 1, the tool holder 44 supports a sensor 50 by means of a rotatable bearing.

Though the illustrated tool holder 44 is shown equipped with the sensor 50, the tool holder may alternatively hold a mechanical hand or an assembly tool, such as an automatic screw-tightening tool. Furthermore, although the sensor is mounted on the tool holder 44 as an independent tool in the shown embodiment, it would also be possible to provide the sensor at the end of some other tool.

The first joint 36 includes a first horizontally pivotable drive mechanism including an electrical servomotor 52 and a speed reducer 54. As in the foregoing first joint 36, the second joint 38 is provided with a second horizontally pivotable drive mechanism including an electric servo-motor 56 and a speed reducer 58. The first and second arms 34 and 40 are respectively driven by the first and second horizontally pivotable drive mechanisms to pivot horizontally about the pivot axes $P_{36}$ and $P_{38}$ via respective drive shafts 60 and 62.

Toothed pulleys 64 and 66 are secured to the drive shafts 60 and 62, respectively. The toothed pulleys 64 and 66 are associated with a toothed pulley 72 provided in the sensor 50 via toothed belts 68 and 70. The sensor 50 is driven to rotate with respect to the tool holder 44 by the toothed pulley 72. Thus, when the first arm 34 and/or the second arm 40 are pivoted about their pivot axes $P_{36}$ and $P_{38}$, the sensor may retain its own orientation.

It should be appreciated that although it is not always necessary to fix the rotational position of the sensor in order to input co-ordinates it is necessary when using a mechanical hand, an automated screw-tightening tool and equivalent tools.

The robot constructed as set forth above is installed next to a transfer conveyor in an automotive vehicle body assembly line, vehicle parts assembly line or the like. In general, the transfer conveyor is operated intermittently so that for a given period of time, the robot can perform programmed assembly operations on a stationary workpiece. In the shown embodiment, the attachment of a glove box lid 76 to a glove box 78 in an instrument panel 74 is illustrated. The following description will be directed toward programming the operation of the robot during attachment of the glove box lid 78 to the glove box 76. However, it should be noted that the programming procedure explained below is not to be regarded as specific to the attachment of the glove box lid and the glove box.

Figure 2:
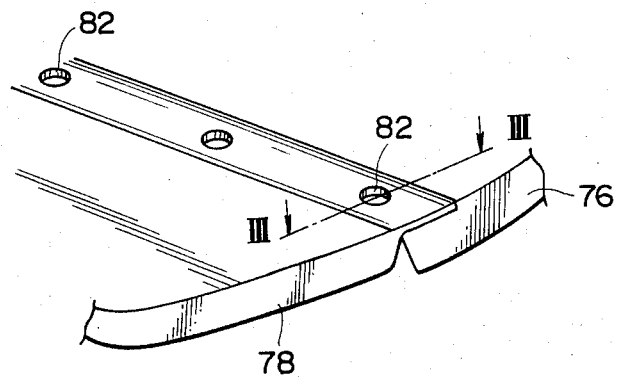
FIG. 2 is an enlarged perspective view of part of a glove box lid shown in FIG. 1.
Figure 3:
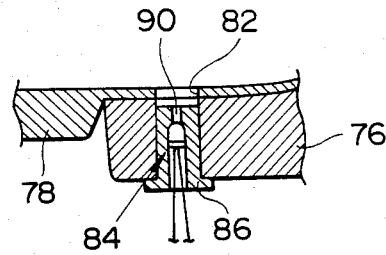
FIG. 3 is a cross-section taken along line III—III of FIG. 2.

In FIG. 1, an automotive instrument panel 74 is positioned and clamped on the transfer conveyor 80 in a per se well-known manner. As shown in FIG. 2, holes 82 for receiving tapping screws (see FIG. 13) are formed along the edge of the glove box 76 and the edge of the glove box lid 78 overlapping the edge of the glove box. A light emitting device 84 is installed within each of the holes 82. The light-emitting device 84 comprises a cylindrical casing 86 engageable with the hole 82 and a luminous member such as a photo-diode 88 housed in the cylindrical casing, as shown in FIG. 3. A small aperture 90 is formed in the casing 86 opposite the center of the hole 82 to allow light from the photo-diode 88 to pass therethrough.

Figure 4:
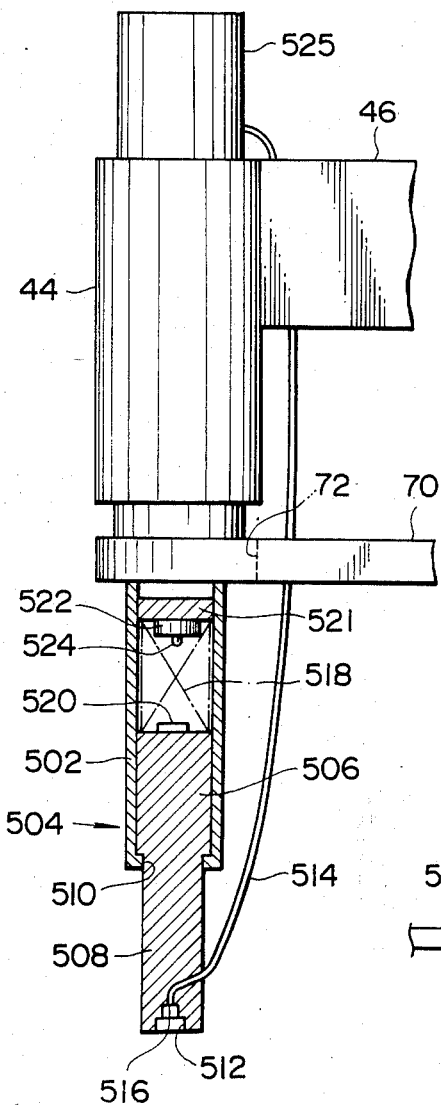
FIG. 4 is an enlarged elevation in partial section schematically showing the sensor of FIG. 1.

On the other hand, as shown in FIG. 4, the sensor 50 has a cylindrical casing 502. A larger diameter section 506 of a movable member 504 is retained within the interior of the casing 502. A smaller diameter section 508 of the movable member 504 protrudes downwards from the casing through an opening 510 in the lower end of the casing. A recess 512 is formed in the lower end of the smaller diameter section. The photo-receiving end 516 of an optical fiber 514 is exposed within the recess 512 and is directed downward.

The movable member 504 is normally biased downwards by a spring 518 housed within the sensor casing. On the other hand, the top of the larger diameter section 506 of the movable member 504 opposes the trigger contact 524 of a limit switch 522 mounted on the underside of a frmae 521 at the top of the casing 502. The top of the larger diameter section contacts the trigger contact 524 of the limit switch 522 at the uppermost limit of travel of the movable member 504. This limit switch 522 serves as a means for detecting the vertical position of the robot.

Figure 5:
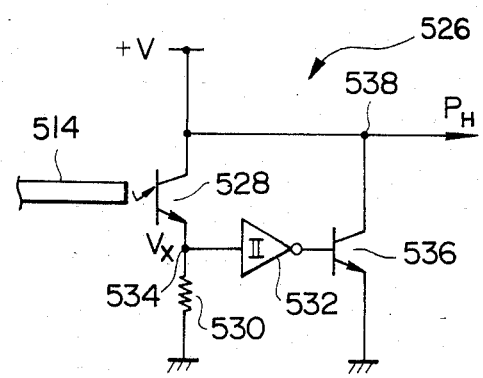
FIG. 5 is a circuit diagram of an example of a detector circuit.

Referring to FIG. 5, the end 516 of the optical fiber 514 opposes the base electrode of a photo-transistor 528 in a detector circuit 526 housed in the upper section 525 of the sensor casing 502. The emitter electrode of the photo-transistor 528 is connected to a grounded resistor 520 at a junction 534 so that a voltage $V_x$ corresponding to the amplitude of light transmitted through the optical fiber 514 is generated across the resistor 530. The photo-transistor 528 is also connected to a Schmitt-trigger inverter 532, which may be of CMOS technology, for example. Thus, the input voltage of the Schmitt-trigger inverter 532 from junction 534 is equal to the voltage $V_x$ across the resistor 530. The Schmitt-trigger inverter 532 compares the input voltage $V_x$ with a predetermined reference voltage $V_{TH}$ and produces an output e which switches between HIGH and LOW levels. The reference voltage $V_{TH}$ of the Schmitt-trigger inverter 532 is so selected that the output goes LOW when the light from the photo-diode 88 is transmitted through the optical fiber and otherwise is HIGH. The output terminal of the Schmitt-trigger inverter 532 is connected to the base electrode of a transistor 536. The collector electrode of transistor 536 is connected to a power source $+V$. The transistor 536 is non-conductive when the output e of the Schmitt-trigger inverter 532 is LOW, generating a bias voltage at its collector electrode, and is conductive, dropping the collector voltage LOW when the output e is HIGH. Therefore, the electrical signal $P_H$ at the junction 538 between transistor 536 and the power source goes HIGH when the output e is LOW and goes LOW when the output e is HIGH.

The aforementioned optical fiber and the detector circuit 526 of FIG. 5 constitute a working position detecting means for detecting the position of through openings in the glove box and the glove box lid. The detector circuit 526 is connected to the control circuit of the robot, shown in FIG. 6. The detector circuit 526 sends a HIGH level detector signal $P_H$ to the control circuit whenever the through openings 82 of the glove box and the glove box lid are detected. In addition, the control circuit is connected to pulse generators 102, 104 and 106 (generators 104 and 106 not shown) associated with the output shafts of the servomotors 32, 52 and 58 of FIG. 1 respectively. The pulse generator 102 sends a vertical position signal Sv representative of magnitude of displacement of the lifter 28 from its initial position to the control circuit. The pulse generators 104 and 106 send first and second horizontal position signals $S_{H1}$ and $S_{H2}$ representative of the horizontal displacement of the first and second arms 34 and 40 from their respective initial positions.

Figure 6:
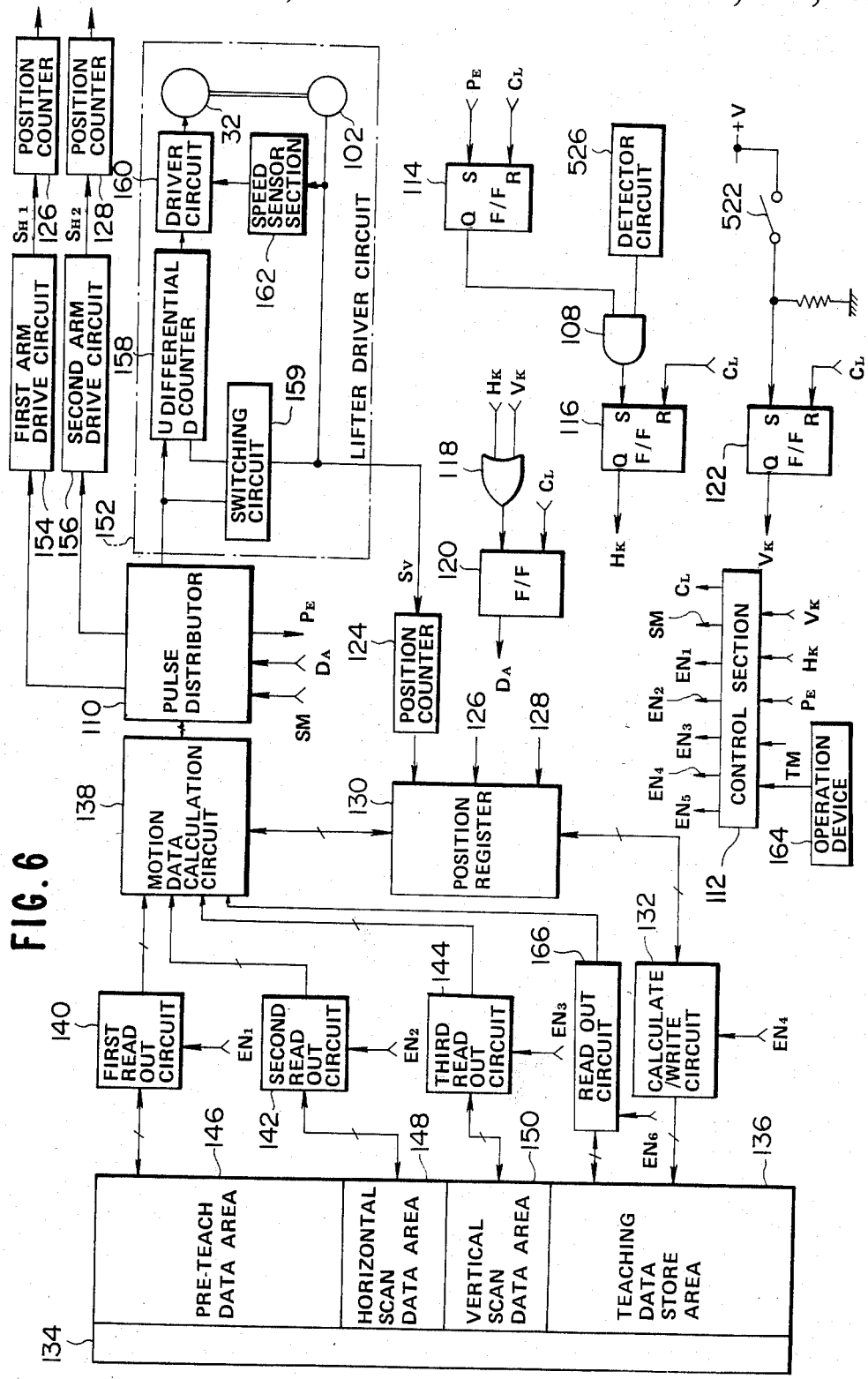
FIG. 6 is a block diagram of a circuit for controlling the horizontal multi-axis-type robot of FIG. 1, which circuit includes the preferred embodiment of teaching device according to the present invention.

FIG. 6 shows the control circuit for the robot including the preferred embodiment of a co-ordinate inputting device according to the present invention. The detector circuit 526 of the sensor 50 is connected to one input terminal of the AND gate 108. The other input terminal of the AND gate 108 is connected to the output terminal of a flip-flop 114, the set terminal of which is connected to an output terminal of the pulse distributor 110 outputting a distribution end signal $P_E$ and the reset terminal of which is connected to an output terminal of a control section 112 outputting a clear signal $C_L$. The output terminal of the AND gate 108 is connected to the set input terminal of a flip-flop 116. The reset terminal of the flip-flop 116 is connected to the output terminal of the control section 112 outputting the clear signal $C_L$. The signal $H_K$ at the output terminal of the flip-flop 116 serves as a horizontal position detecting signal and is sent to the set terminal of a flip-flop 120 via an OR gate 118. At the same time, the output $H_K$ of the flip-flop 116 is also sent to the control section 112. The OR gate 118 is also connected to the output terminal of a flip-flop 122. The set input of flip-flop 122 is connected to the limit switch 522 of the sensor 50 and the reset input thereof is connected to the output terminal of the control section 112 outputting the clear signal $C_L$. The output $V_K$ of the flip-flop 122 serves as a vertical position detecting signal. The output terminal of the flip-flop 122 is connected to the OR gate 118 and is also connected to control section 112.

In addition, the pulse generator 102 associated with the output shaft of the servo-motor 32 is connected to a position counter 124 adapted to tally the vertical displacement of the lifter 28 from its initial position. Similarly, the pulse generators 104 and 106 (not shown) engaging the output shafts of the servo-motors 52 and 56 (not shown) are connected to the position counters 126 and 128 adapted to tally the horizontal displacement of the first and second arms from their initial positions. Each of the position counters 124, 126 and 128 counts pulses produced by the pulse generator 102, 104 and 106 according to the revolution of the corresponding servo-motor. The position counters 124, 126 and 128 all send counter signals indicative of their counter values to a single position register 130.

The position register 130 is connected to a calculating/writing circuit 132 to send positional data derived from the counter signals. The calculating/writing circuit 132 is also connected to an output terminal of the control section 112 to receive a write command $E_{N4}$ which causes circuit 132 to write positional data into a teaching data storage area 136 in a memory device 134. The position register 130 also send the positional data to a motion data calculation circuit 138. The motion data calculation circuit 138 is connected for input to a pre-teach data area 146, a horizontal scanning data area 148 and a vertical scanning data area 150 via first, second and third read-out circuits 140, 142 and 144 respectively. The first read-out circuit 140 is connected to receive a first read-out command $E_{N1}$, whereupon it reads out data preliminarily stored in the pre-teach data area 146 and feeds the read-out data to the motion data calculation circuit 138. The second read-out circuit 142 is connected to an output terminal of the control section 112 outputting the second read-out command $E_{N2}$, which causes it to access the horizontal scan data area 148 to read-out the data therein and to feed the read-out data to the motion data calculation circuit 138. Similarly, the third read-out circuit 144 is connected to an output terminal of the control section outputting the third read-out command $E_{N3}$ which causes it to access the vertical scan data area 150 to read-out the data and to feed the read-out data to the motion data calculation circuit 138.

The motion data calculation circuit 138 calculates and derives a measure of the robot movement in terms of given three-dimensional co-ordinates based on the position data from the position register and the pre-teach data, the horizontal scan data and the vertical scan data read-out by the first- to third-read-out circuits 140, 142 and 144. The motion data calculation circuit 138 sends the motion data obtained from the result of the foregoing calculation to a pulse distributor 110. The pulse distributor 110 produces drive signals for the lifter 28, the first arm 34 and the second arm 40 based on the motion data from the motion data calculation circuit 138. The driver signals of the pulse distributor 110 are fed to a lifter driver circuit 152, a first arm drive circuit 154 and a second arm drive circuit 156.

The lifter driver circuit 152 has a differential counter 158 connected to the pulse generator 102 via a switching circuit 159. The switching circuit 159 selectively establishes electrical communication between the UP-terminal of the differential counter 158 and the pulse generator 102. The differential counter 158 constitutes the lifter driver circuit in conjunction with a driver circuit 160 producing a driving signal for the servo-motor 32 according to the output of the differential counter 158, and a speed sensor section 162 for feedback-controlling the speed of the lifter. The feedback control circuit 162 performs frequency-to-voltage (F/V) conversion for the pulse signal from the pulse generator 102 to derive a measure of the speed of the lifter and then produces a feedback signal sent to the driver circuit 160 on the basis of the detected speed. The driver circuit 160 compares the signal value of the feedback signal with the counter value of the differential counter 158, which counter value serves as a speed reference value so that the driving speed of the lifter can be feedback controlled to be equal to the speed reference value.

The first and second arm drive circuits 154 and 156 are arranged similarly to the above lifter driver circuit 152.

The pulse distributor 110 is also connected to the output terminal of the control section 112 which outputs an intervening mode signal $S_M$. Finally, the pulse distributor 110 is connected to the output terminal of the flip-flop 120 to receive a stop command signal $D_A$, in response to which the lifter driver circuit 152, the first arm drive circuit 154 and the second arm drive circuit 156 are actuated so as to fix the sensor position.

The control section 112 is connected to a manually operated operation device 164 to receive therefrom a teaching command $T_M$ and a robot actuation command $S_T$.

As set forth above, the memory 134 has the pre-teach data area 146, the horizontal scan data area, the vertical scan data area 150 and the teaching data storage area. The contents of respective areas are given below In the pre-teach data area, positional data, in the form of three-dimensional co-ordinates, of various positions near the hole 82 are stored, which position data is assumed to be programmed by means of a CAD (Computer Aided Design) system, for example. The position data is representative of the co-ordinates of the working end of the tool attached to the wrist portion of the robot. In the pre-teach data area, intermediate position data from the robot initial position to the first working position and from the last working position to the initial position are stored.

It should be appreciated that it would also be possible to input data for storage in the pre-teach data area via programming by means of a teaching box by which the robot is manually operated to retain the operational movements performed during this operation.

In the shown embodiment, the positional data to be stored in the pre-teach data area during programming of the robot operation will be of limited accuracy. The positional data or more stored in the pre-teach data area is "rough" data identifying points near various working positions.

Position vector data, for example two-position vector data, required to calculate the positional data of the starting and final positions for interpolating operation performed by the pulse distributor 110, are stored in the horizontal scan data area 148.

In the vertical scan data area 150, positional data identifying the magnitude of lifter movement is stored. The three-dimensional positional data of each working position obtained by a process to be explained later is stored in the teaching data storage area 136. The position data stored in the teaching data store area will be read-out by the read-out circuit 166 and fed to the motion data calculation circuit 138.

The motion data calculation circuit 138 is operative in response to read-out memory data fed from the first to third read-out circuits 140, 142 and 144. When the first read-out circuit 140 becomes active in response to the first read-out command $E_{N1}$, the first read-out circuit accesses the pre-teach data area to read-out position data stored serially in the pre-teach data area. The motion data 138 compares the read-out data from the pre-teach data area with the current positional data from the position register 130 and determines the amount of movement of each of the lifter 28 and the first and second arms 34 and 40 on the basis of the difference between the positional data from the pre-teach data area and from the position register. The motion data calculating circuit 138 produces signals representative of the determined amount of movement and feeds these signals to the pulse distributor 110. As a result, the sensor 50 is moved to the position in the three-dimensional co-ordinates corresponding to the position data read-out from the pre-teach data area.

The second read-out circuit 142 becomes active in response to the second read-out command $E_{N2}$ to access the horizontal scan data area 148. The position vector data stored in the horizontal scan data area is thus inputted to the motion data calculating circuit 138. The motion data calculating circuit 138 derives the starting point positional data and the end point positional data repeatedly on the basis of the position vector data and the positional data from the position register 130. The motion data calculating circuit 138 repeatedly sends signals representative of the starting point positional data and the end point positional data to the pulse distributor 110.

When the third read-out command $E_{N3}$ is outputted by the control section 112, the vertical scan data area is accessed. The vertical positional data stored in the vertical scanning data area 150 are read out through the third read-out circuit 144 and fed to the motion data calculating circuit 138. The motion data calculating circuit 138 compares the vertical positional data from the vertical scan data area with the positional data from the position register 130 to derive the vertical displacement of the lifter 28. The motion data calculating circuit 138 then sends a signal representative of the derived vertical displacement to the pulse distributor 110.

The pulse distributor 110 operates in either of two different operational modes depending upon the presence or absence of the interpolation mode command $S_M$. When the interpolation mode command $S_M$ is not inputted, then the pre-teach data area 146 or the vertical scanning data area 150 is to be accessed, and the pulse distributor 110 produces pulse-form drive signals having a number of pulses representative of the displacement (vertical translation and horizontal angular displacement) corresponding to the output signal value of the motion data calculating circuit 138. The drive signals of the pulse distributor 110 are fed to the differential counter 150 of the lifter driver circuit 152 and the differential counters (not shown) of the first and second arm driver circuits 154 and 156.

On the other hand, when the interpolation mode command $S_M$ is present, then the horizontal scan data area is accessed, and the pulse distributor 110 repeatedly receives the starting point positional data and the end point positional data from the motion data calculation circuit 138. The pulse distributor 110 sequentially produces interpolation pulses to move the sensor 50 directly from the starting point to the end point along scanning trace. The interpolation pulses are inputted to the first and second arm driver circuits 154 and 156. Thus, the sensor 50 is moved along the scanning trace programmed in the horizontal scan data area 148.

The pulse distributor 110 is responsive to the set output of the flip-flop 120 which serves as a stop signal to stop the sensor 50 at the position at which the set output is received. At this time, the pulse distributor 110 compensates for displacement of the sensor 50 from the target position due to lag of response in the control section and controls the drive signal so that the sensor can accurately be stopped at the desired position.

The differential counter 158 of the lifter driver circuit 152 counts the drive signal pulses from the pulse distributor 110. The differential counter 158 sends a digital signal corresponding to its counter value to the drive circuit 160. The drive circuit 160 converts the digital signal from the differential counter 158 into an analog signal which drives the servomotor 32 via the servoamplifier.

Until a predetermined period of time expires after activating the servomotor 32 in response to the drive signal from the drive circuit 160, the counter value of the differential counter is increased at a constant rate determined depending upon the period of the pulse signal and the output characteristics of the pulse generator 102. After the predetermined period of time expires, the counter value remains a constant value. When the input to the UP input from the pulse distributor 110 terminates, the differential counter 158 decrements the counter value in response to pulses from the pulse generator 102.

In this manner, the counter value of the differential counter 158 may serve as the operation speed reference value which is used to feedback control the drive circuit 160 so that the actual operation speed (which is derived by frequency-to-voltage conversion of the pulse signal of the pulse generator 102) always approximates the operation speed reference value.

As set forth above, when the differential counter starts counting the pulses from the pulse distributor 110, the motor 32 starts to operate. The counter value increases, then remains a constant value and finally decreases during each operation cycle. The motor 32 rotates through the number of cycles corresponding to the number of pulses. Thus, the displacement of the lifter in the up-and-down direction is controlled. When the number of rotational cycles of the motor 32 is more or less than that required, the following compensating operation is carried out.

In cases where an increment-type pulse generator is used as the pulse generator 102, the rotational direction of the motor can be detected by detecting the phase of the pulse signal produced thereby. Therefore, by enabling the switching circuit 159 to detect the phase difference, the pulse signal of the pulse generator 102 can be inputted to the down-input terminal of the differential counter 158 while the motor is driven in one direction to raise the lifter, and to the up-input terminal while the motor is driven in the opposite direction to lower the lifter.

By this arrangement, when the number of motor cycles is less than that required, the counter value of the differential counter 158 is non-zero so that the motor continues to rotate in the original direction until the counter value becomes zero. On the other hand, if the motor has rotated through an excessive number of cycles, the counter value becomes minus so that the motor will run in the opposite direction. The motor will continue to run in the opposite direction until the counter value is incremented by the pulse signal of the pulse generator 102 to zero.

Thus, the motor rotation is responsive to the number of pulses from the pulse distributor 110, and the motor is stopped when the required number of rotation cycles has been completed.

The position register 130 is adapted to store the aggregate rotational displacement (rotational displacement in normal direction—rotational displacement in reverse direction) count of all three position counters 124, 126 and 128. Thus, the position register 130 always holds the displacement coordinates of the robot from its initial position.

The position counters 124, 126 and 128 each include a switching circuit 159 so that the pulse signals from the pulse generators 102, 104 and 106 will go to the up-count terminal while the corresponding motor is running in a normal direction. Similarly, the pulse signals go to the down-count terminal while the motor is running in the opposite direction. This is accomplished by distinguishing the motor operating direction on the basis of the phase of the pulse signal.

As set forth above, the sensor 50 mounted on the wrist portion of the robot 1 of FIG. 1 can be moved according to the instructions given by the control section.

Figure 7:
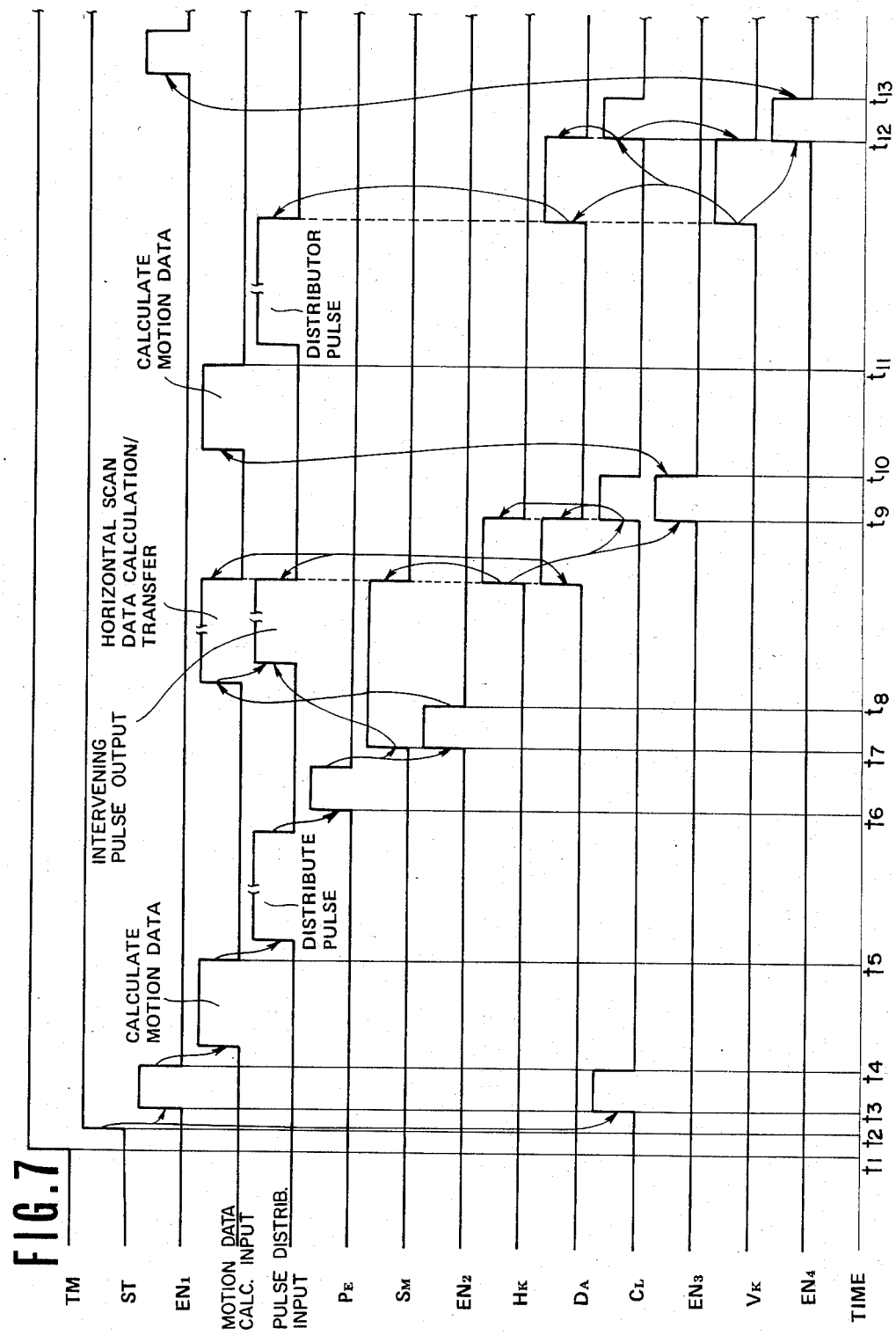
FIG. 7 is a timing chart of the circuit operation of the circuit of FIG. 6.

Next, the programming procedure for programming the operation of the robot which is constructed as set forth above by means of the preferred embodiment of a co-ordinates inputting unit according to the present invention will be explained below in terms of an example in which the glove box lid 78 is to be attached to the glove box 76, and with reference to the timing chart of FIG. 7.

Figure 8:
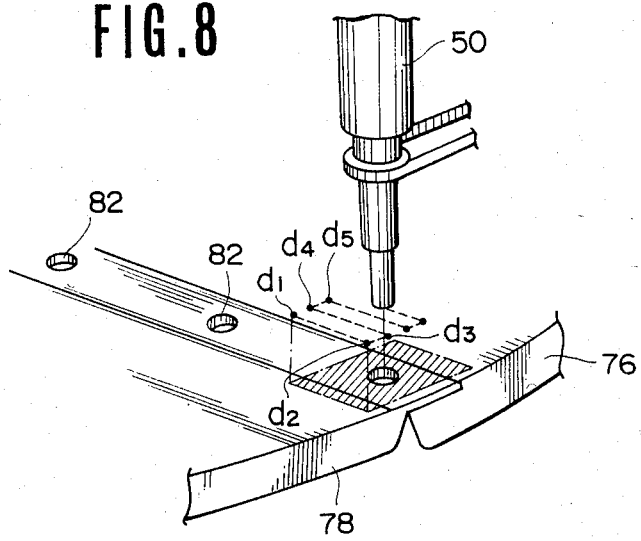
FIG. 8 and FIG. 9 are explanatory diagrams of the horizontal scan performed by the circuit of FIG. 6.

First, the manual operation device 164 is manually operated to switch the control mode to programming mode. At time points $t_1$ and $t_2$, the teaching command $T_M$ and the robot actuation command $S_T$ are inputted to the control section 112 from the operation device 164. The control section 112 is responsive to the robot actuation command $S_T$ to produce a clear signal $C_L$ at a time point $t_3$ to reset the flip-flops 114, 116, 120 and 122. At the same time, the control section 112 outputs the first read-out command $E_{N1}$ to the first read-out circuit 140. The first read-out circuit 140 is responsive to the first read-out command to access the pre-teach data area 146. The positional data of the first destination, for example the positional data of the position $d_1$ in FIG. 8, is then read out and fed to the motion data calculation circuit 138. At this point in time, the data in the position register 130 indicates the initial position of the sensor 50. The position register 130 feeds the positional data of the initial position to the motion data calculation circuit 138. The motion data calculation circuit 138 compares the positional data of the point $d_1$ read-out from the pre-teach data area 146 with the positional data from the position register 130 at a time $t_4$ at which the first read-out command $E_{N1}$ from the control section 112 ends. The motion data calculating circuit 138 derives the displacement of the sensor from the initial position based on the difference between the compared positional data. The motion data calculating circuit 138 transfers the motion data to the pulse distributor 110 at the time point $t_5$, which motion data is indicative of the amount of displacement of the sensor.

At this time, the flip-flop 120 connected to the pulse distributor 110 is still reset position due to the clear signal $C_L$. Also, an interpolation mode command $S_M$ has not yet been outputted by the interpolation mode command output terminal of the control section 112. Thus, the pulse distributor 110 calculates the desired displacement of the lifter 28 and the first and second arms 34 and 40 by the time point $t_6$ after the motion data is received from the motion data calculating circuit 138. The pulse distributor 110 produces drive signals having a number of pulses corresponding to the desired displacement and feeds the drive signals to the differential counters of the lifter driver circuit 152 and the first and second arm driver circuits 154 and 156.

The pulse distributor 110 feeds a distribution end signal $P_E$ at the time point $t_6$ after the end of the driver signals to the set terminal of the flip-flop 114 to set the latter. At the same time, the distribution end signal $P_E$ of the pulse distributor 110 is inputted to the $P_E$ input terminal of the control section 112. The control section 112 is responsive to the distribution end signal $P_E$ to produce the second read-out command $E_{N2}$ and the interpolation mode command $S_M$ at the time point $t_7$. The second read-out circuit 142 is responsive to the second read-out command $E_{N2}$ to access the horizontal scan data area 148. Thus the position vector data in the horizontal scan data area 148 is read out.

Figure 9:
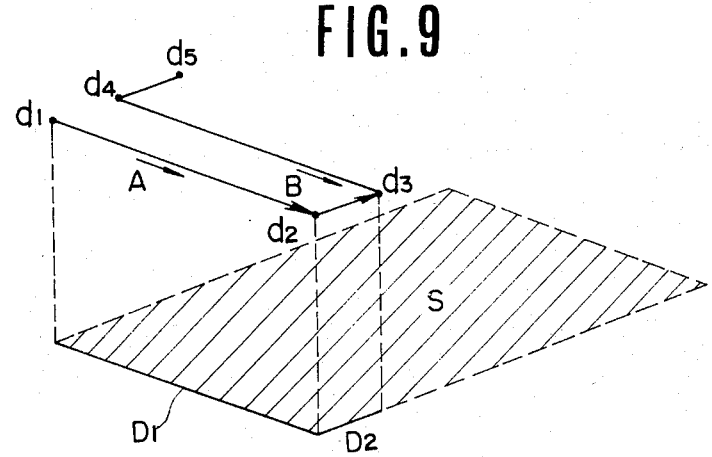

The position vector data includes a position vector $\overline{A}$ (the root coordinates of the vector are undetermined) which indicates the length $D_1$ in FIG. 9 and the direction in the robot coordinate system, which length $D_1$ corresponds to one scan component defining the scanning area of FIG. 9, and a position vector $\overline{B}$ (the route coordinates of the vector is undetermined) indicates the length which corresponds to the other component $D_2$ of the scanning area divided into predetermined segments and directions in the robot coordinate system.

The motion data calculating circuit 138 performs the arithmetic operations described below based on the position vector data and the positional data from the position register 130 at time $t_8$ at which the second read-out command $E_{N2}$ ends after the above two vector data are received. The results of the arithmetic operations are transferred to the pulse distributor 110.

First, based on the positional data of the sensor 50 received from the position register 130, the current position of the sensor 50 (which may correspond to the position $d_1$ of FIGS. 8 and 9) is derived.

Next, by taking the positional data of the current position $d_1$ of the sensor 50 as the root coordinates of the vector $\overline{A}$, the positional data of a position $d_2$ of FIGS. 8 and 9 are calculated.

Then, the positional data of the points $d_1$ and $d_2$ are transferred to the pulse distributor 110 as the first start point positional data and the end point position data.

The pulse distributor 110, which is in interpolation mode in response to the interpolation mode command $S_M$, derives interpolating pulse based on the foregoing start point positional data and end point positional data transferred from the motion data calculating circuit 138 so that the end of the sensor 50 can be moved directly from the point $d_1$ to the point $d_2$.

On the other hand, the motion data calculating circuit 138 starts calculation of the positional data of the point $d_3$ in FIGS. 8 and 9 by taking the coordinates of the point $d_2$ as the root coordinates for the vector $\overline{B}$, immediately after transferring the positional data of the points $d_1$ and $d_2$.

The positional data of the points $d_2$ and $d_3$ are then transferred to the pulse distributor 110 as the next start point positional data and end point positional data.

The pulse distributor 110 performs the interpolating operation subsequent to the first interpolating operation based on the next start point positional data and the end point positional data.

In this way, the end of the sensor body performs a horizontal scan through the scanning area S including the hole 82 of FIG. 8.

In FIGS. 8 and 9, the position vector data of the vector $\overline{A}$ is utilized to derive the positional data of points $d_4, d_5 \ldots$.

Next, when the end of the sensor 50 reaches the position opposite the center of the hole 82, as shown in FIG. 8, the light of a light-emitting diode 88 transmitted through the hole 82 is transferred to the detector circuit 526 through the light-receiving end of the optical fiber 514. The detector circuit 526 is responsive to the light to produce a HIGH-level output $P_H$.

The HIGH level output $P_H$ of the detector circuit 526 is inputted to the AND gate 108 to open the gate in conjunction with the HIGH-level output of the flip-flop 114 to set the flip-flop 116. When set, the flip-flop 116 outputs a HIGH-level signal as the horizontal position detector signal $H_K$.

In response to this horizontal position detector signal $H_K$, the flip-flop 120 is set via the OR gate 118. In the set condition, the flip-flop 120 outputs a HIGH-level signal serving as the stop signal $D_A$ to stop operation of the pulse distributor 11 (including clearing the data). Also in response to the stop signal $D_A$, the motion data calculating circuit 138 is cleared.

Thus, the end of the sensor 50 is stopped at the point opposite the center of the hole 82.

On the other hand, the control section 112 is responsive to the horizontal position detector signal $H_K$ to output a clear signal $C_L$ to reset the flip-flops 114, 116, 120 and 122 and thereby close the AND gate 108. In response to resetting of the flip-flop 120, the pulse distributor 110 is released from the disabled state. At the same time, the control section outputs the third read-out command $E_{N3}$ at the time point $t_9$ to the third read-out circuit 144 to operate the latter. The position data stored in the vertical scan data area 150 of the memory 134 and indicative of the vertical displacement of the sensor 50 towards the hole, is read out. The read-out positional data is fed to the motion data calculating circuit 138.

The motion data calculating circuit 138 derives the amount of vertical displacement of the lifter 28 of the robot at time $t_{10}$ after receiving the positional data and upon termination of the third read-out command $E_{N3}$. The motion data calculating circuit 138 feeds the results of calculation to the pulse distributor 110, at the time point $t_8$.

The pulse distributor 110, after receiving the motion data from the motion data calculating circuit 138, feeds the pulse signal corresponding to the results of calculations to the differential counter 158 of the lifter driver circuit 152.

As a result, the lifter driver circuit 152 becomes active to lower the end of the sensor towards the hole 82 (vertical scan). When the movable element 504 acting as the end of the sensor 50 comes into contact with the circumferential edge of the hole 82, the movable element 504 is displaced into the sensor casing 502 to turn the limit switch 522 ON. In response turning the limit switch 522 ON, the flip-flop 122 is set. When set, the flip-flop 122 outputs a HIGH-level signal as the vertical position detector signal $V_K$.

The vertical position detector signal $V_K$ is fed to the flip-flop 120 via the OR gate 118 to set the flip-flop 120. When set, the flip-flop 120 produces a HIGH-level signal serving as the stop signal $D_A$. Due to this stop signal $D_A$, the pulse distributor 110 stops operating so as to stop vertical scan of the sensor 50. The control section 112 produces the clear signal $C_L$ upon termination of the vertical position detector signal $V_K$, at the time point $t_{12}$, to reset the flip-flops 114, 116, 120 and 122 and thus release the pulse distributor 110 from the inoperative state. At time $t_{12}$, the control section further sends a write command $E_{N4}$ to the calculation/write circuit 132 to make the latter operative.

The calculation/write circuit 132 processes the positional data stored in the position register 130 to derive the displacement of the lifter 28 and the first and second arms 34 and 40 from their initial positions and the coordinates in the robot coordinate system of the first working position. The calculation/write circuit 132 transfers the results of calculations into the teach data storage area 136.

During this writing operation, the control section 112 continuously checks the memory to detect that the position data of the first hole 82 is written in the teach data storage area. After the positional data has been confirmed as being written in at time $t_{13}$, the control section 112 again sends the first read-out command $E_{N1}$ to the first read-out circuit 140 to repeat the foregoing coordinates inputting operation.

After all of the positional data of all of the holes 82 are written in, the control section holds the system in the stand-by state until an operation command for actual assembly operations is inputted.

It should be appreciated that the positional data of each hole is representative of the positional data of the points at which the working end of the automatic screw tightening tool attached to the wrist portion of the robot is to be positioned and data for further downward movement of the automatic screw-tightening tool during tightening operation may be stored separately in the memory 134.

In practical tightening operation, when the supply of screws is performed by the robot according to an operation program, the operation device 164 is manually operated to feed execution command $E_{N5}$ to the control section 112 to perform the operation program. The control section 112 is responsive to the execution command $E_{N5}$ to feed the execution command to the read-out circuit 166 to sequentially read out the coordinates of each working position. The coordinates of each working position are transferred to the motion data calculating circuit 138. The motion data calculating circuit 138 calculates the displacements of the lifter 28 and the first and second arms 34 and 40 based on the position data read out from the memory 134 and the current position data from the position register 130. In this way, the motion data calculating circuit 138 derives the motion data which is to be fed to the pulse distributor 110. The pulse distributor produces a drive signal based on the transferred motion data and feeds the drive signals to the lifter driver circuit 152, the first arm driver circuit 154 and the second arm driver circuit 156 to drive the corresponding servomotors 32, 52 and 56. Thus, the working end of the tool held in the wrist position 34 is moved to positions corresponding to each of the working positions. At each working position, the control section 112 controls the tool to perform the screw-tightening operation, screw supply and so forth in per se well-known manners.

In FIG. 6, the memory 134, the second and third read-out circuits 142 and 144, the motion data calculation circuit 138, the pulse distributor 110, the control section 112 and the driver circuits 152, 154 and 156 constitute scanning control means. On the other hand, the memory 134, the calculation/write circuit 132, the control section 112 and so forth constitute memory means.

Figure 10:
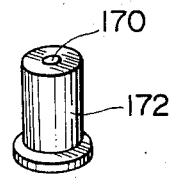
FIG. 10 is a perspective view of a reflector.

While the foregoing embodiment has been disclosed in terms of a light receiver provided in the sensor of the working position detecting means and a light-emitter provided in the hole 82, it can be modified to provide a light-emitter in the sensor 170 and a reflector 172 in the hole to reflect the light from the light-emitter, as shown in FIG. 10. Furthermore, in cases where there are some difference in brightness between the hole and plane portion of the glove box lid, it may not be necessary to provide the light-emitter to detect the position of the hole.

Figure 11A:
FIGS. 11(A) and (B) are diagrams of modified scanning patterns.
Figure 11B:
Figure 12:
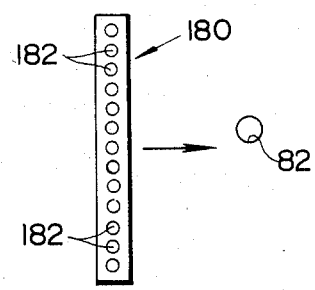
FIG. 12 is an illustration of a modification of a working position detecting means.

Furthermore, the manner of performing scan in the scanning area of FIGS. 8 and 9 can be modified in any way, for example as illustrated in FIGS. 11A and 11B. Furthermore, by providing a plurality of light-receiving portion 182 at the top of the sensor, scanning operation need only be performed once in the direction represented by the arrow to detect the position of the hole based on the position of the light-receiving portion 182 detecting the light and amount of scanning movement of the light-receiving portions.

While the foregoing embodiment has been disclosed in terms of position programming for the glove box lid holes in the instrument panel, it would be possible to apply the foregoing procedure for programming the robot for assembly operations for other components in the instrument panel. Furthermore, the same procedure may be used for other assembly operations such as teaching of positions for spot welding in automotive vehicle body assembly. In case of programming the stop welding points, luminous paint may be applied to the desired welding points and the sensor may detect the points at which the luminous paint is applied.

If there are no obstacles on the objective workpiece to be horizontally scanned by the sensor body 7, the scanning area can be widened, thereby further simplifying the pre-teaching steps.

Figure 13:
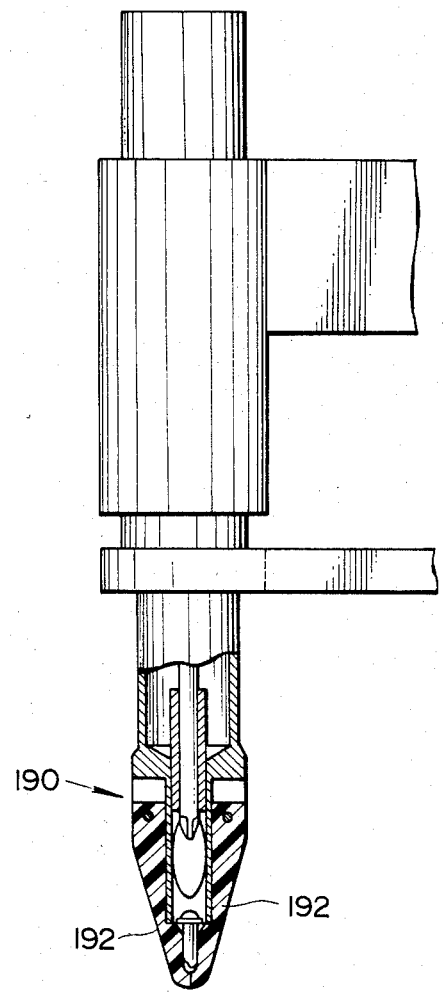
FIG. 13 is an elevation in partial section of an example of an automatic screw-tightening tool.

In the above-mentioned embodiment, although scanning is also carried out in the vertical direction, result superior to the prior art can also be obtained by storing the positional data of the top end of the sensor body whenever the hole 12a is detected by horizontal scanning. In the above embodiment, although the light-receiving face 15a of the optical fiber 15 is disposed at the top end of the sensor body, the present invention is not limited to this approach. For example, when an automatic screw-fixing tool 40 as shown in FIG. 13 is attached to the wrist 46 of the robot 1, the light-receiving member may be disposed in the end of chuck claws 192, 194 which move between closed and opened positions, or when a mechanical hand, not shown, is attached to the wrist 8 of the robot, the light receiving member may be disposed in the end thereof.

In the above embodiment, although the present invention is applied to a horizontal multi-joints-type robot with three shafts, it is not limited to only this case, but may also be applied to any shaft-constituted robot.

As explained above, the teaching device according to the present invention comprises a working position detecting means attached to the working end of the robot, the working position detecting means automatically scanning through a predetermined area containing the working position of the robot so that the position of the robot at the time the working position detecting means detects the working point of the robot is stored. Thus, teaching can be performed relatively easily, accurately and quickly.

I claim:

1. A method for inputting coordinate data for a robot comprising the steps of:
    positioning a light-emitting means at a desired working position;
    attaching an optical sensor means for detecting said light-emitting means in said working position to a work end of said robot;
    displacing a movable segment of said robot including said optical sensor means to a predetermined orientation within a predetermined area, said area including said working position, and subsequently moving said optical sensor means with said movable segment of said robot in a predetermined pattern within said predetermined area so that said optical sensor means scans said predetermined area so as to detect the horizontal position of said light emitting means;
    continually detecting the position of said optical sensor means;
    deriving coordinates in the robot coordinate system of the position of said optical sensor means when said optical sensor means detects said light-emitting means; and
    storing the derived coordinates in the robot coordinate system as working position indicative data in a memory means.

2. The method as set forth in claim 1, which further includes the step of manually inputting the coordinates of a starting point of the scanning operation of the working position detecting means in advance of performing scanning, so that said working position detecting means is moved to the starting point from its initial position.

3. The method as set forth in claim 2, wherein said manual input of coordinates of the scanning start point is performed by numerical input by means of a CAD system.

4. The method as set forth in claim 2, wherein said manual input of coordinates of the scanning start point is performed by operating the robot movable segments to the scanning start point by means of manual operation, calculating the displaced position of the working position detecting means and storing the calculated coordinates.

5. The method as set forth in claim 1, wherein said predetermined area includes the working position and is substantially smaller than the robot operation area.

6. The method as set forth in claim 1, wherein said scanning is performed in a horizontal, two-dimensional robot coordinate system.

7. The method as set forth in claim 1, wherein said scanning is carried out within a three-dimensional robot coordinate system and includes horizontal scanning in two horizontal dimensions and an axial direction scan.

8. A teaching device for a robot comprising:
a current position detecting means for detecting a current position of said robot;
a working position detecting means for detecting a working position of said robot, said working position detecting means being disposed at a working end of the robot;
a scan control means for controlling movable segments of said robot and for positioning said movable segments of said robot at a predetermined orientation and for positioning said working position detecting means at a predetermined initial position within a predetermined scanning area including the working position, and subsequently operating said movable segment so that said working position detecting means scans through said predetermined scanning area, including the working position, for detecting said working position;
a memory means for storing the current position of said robot detected by said current position detecting means when said working position detecting means operated by said scan control means detects the working position.

9. The teaching device for a robot as set forth in claim 8, wherein said working position of the robot is a screwhole formed in a workpiece, and said working position detecting means is a light-receiving means which receives the light emitted by a light-emitting means inserted in said screwhole.

10. The teaching device for a robot as set forth in claim 8, wherein said working position of the robot is a screwhole formed in a workpiece, and said working position detecting means is composed of a light-emitting means for emitting the light toward a reflector provided in said screwhole and a light-receiving means for receiving the light reflected by said reflector.

11. A device for inputting coordinates for a robot comprising:
a movable arm including a first movable portion movable along a vertical axis in a three dimensional robot coordinate system having three mutually perpendicular axes, and a second movable portion movable in a horizontal two-dimensional robot coordinate system;
a current position detecting means for detecting a current position of a working end of said movable arm;
a working position detecting means secured to said working end for detecting a working position;
driving means for driving said first and second movable portions;
a scan control means for controlling said driving means so that said second movable portion is initially positioned to a predetermined starting position within a predetermined scanning area including said working position and is subsequently moved within said predetermined scanning area according to a predetermined pattern for scanning; and
a memory means for storing instantaneous coordinates of said working end detected by said current position detecting means when said working position detecting means detects said working position.

12. A device for inputting coordinates for a robot, comprising:
a movable arm including a first movable portion movable along a vertical axis in a three-dimensional robot coordinate system having three mutually perpendicular axes, and a second movable portion movable in horizontal, two-dimensional robot coordinate system;
a current position detecting means for detecting a current position of a working end of said movable arm;
a working position detecting means secured to said working end for detecting a working position;
driving means for driving said first and second movable portions;
a scan control means for numerically controlling said driving means wherein said first and second movable portions are initially positioned to a predetermined starting position within a predetermined scanning area which includes said working position and are subsequently moved within said predetermined area, according to a predetermined pattern for scanning, to detect orientation of said working position; and
a memory means for storing instantaneous coordinates of said working end detected by said current position detecting means when said working position detecting means detects said working position.

13. The device as set forth in claim 11, wherein said working position is a screwhole in a workpiece, and said working position detecting means is a light receiver receiving light emitted by a light emitter provided within said screwhole.

14. The device as set forth in claim 11, wherein said working position is a screwhole in a workpiece, and said working position detecting means comprises a light emitter emitting light towards a reflector provided in said screwhole and a light receiver for receiving light reflected by the reflector.

15. The device as set forth in claim 11, wherein said memory means preliminarily stores the coordinates of a scanning start point located in said predetermined area, said coordinates defining a destination when moving said working position detecting means to said predetermined area.

16. The device as set forth in claim 15, wherein said scan control means temporarily therefor stops said movable portion when said working position detecting means detects said working position.

* * * * *